Dec. 24, 1935.   E. B. GILL ET AL   2,025,100
VIBRATION ABSORBER
Filed Sept. 6, 1932   2 Sheets-Sheet 1

Eldridge B. Gill
Guy O. Danielson   INVENTORS.
BY Loyal J. Miller
   ATTORNEYS.

Dec. 24, 1935.  E. B. GILL ET AL  2,025,100
VIBRATION ABSORBER
Filed Sept. 6, 1932   2 Sheets-Sheet 2
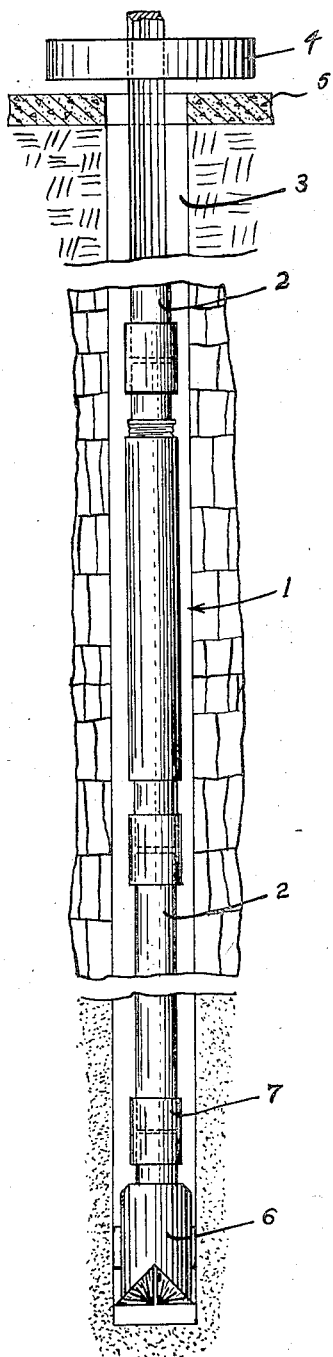
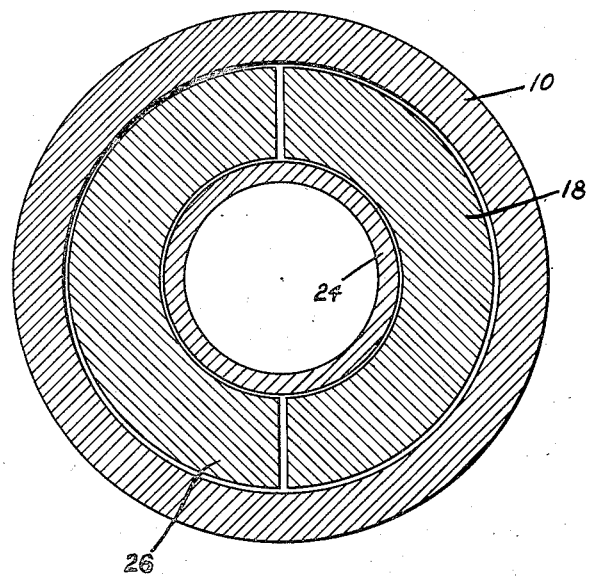

Patented Dec. 24, 1935

2,025,100

UNITED STATES PATENT OFFICE 2,025,100

VIBRATION ABSORBER

Eldridge B. Gill and Guy O. Danielson,
Oklahoma City, Okla.

Application September 6, 1932, Serial No. 631,838

9 Claims. (Cl. 255—28)

Our invention relates to rotary drilling equipment, and more particularly to apparatus for preventing the transmission of shock or vibration from a drill-bit to the drilling stem or column.

A rotary drill-bit in meeting various strata, continuously transmits shock and vibration to the drill stem. The force thus created eventually fatigues or weakens the stem to a point of entire or semi crystallization, in many instances causing the parting of the stem, which in turn necessitates costly "fishing" jobs, and frequently the loss of the well.

Our device is designed to be connected at a desired point or points in the drilling column, and when so installed absorbs the shock or vibration of the bit, thus protecting the stem.

Other objects of the invention are to provide a device of this class which is new, novel, practical and of utility; which will positively transmit the rotary motion of the stem thereabove to the drill-bit; which will not impair the circulation of drilling-fluid to the drill-bit; which may be used as a jar should a bit become stuck in a well; which will combine both a mechanical and a hydraulic shock absorbing medium, or either; which is substantially as strong in withstanding torque stress as the drill stem to which it is connected; which is exteriorly substantially of no greater circumference than the drill-stem to which it is connected, thus insuring its easy insertion and withdrawal from a well; which is simple to assemble and install; which is comparatively cheap to manufacture; and, which will be efficient in accomplishing all of the purposes for which it is intended.

With these and other objects in view as will more fully appear, our invention consists in the construction, novel features, and combination of parts hereinafter more fully described, pointed out in the claims hereto appended, and illustrated in the accompanying drawings, of which Figure 1 is a vertical sectional view of the lower portion of the device;

Fig. 3 is a transverse sectional view taken along the line 3—3 of Fig. 1; and,

Fig. 4 is a fragmentary vertical sectional view through the earth showing the device installed in a drilling column within a well, and showing the preferred relation of the installed device to the drill-bit.

Like characters of reference designate like parts in all of the figures.

Figure 1:
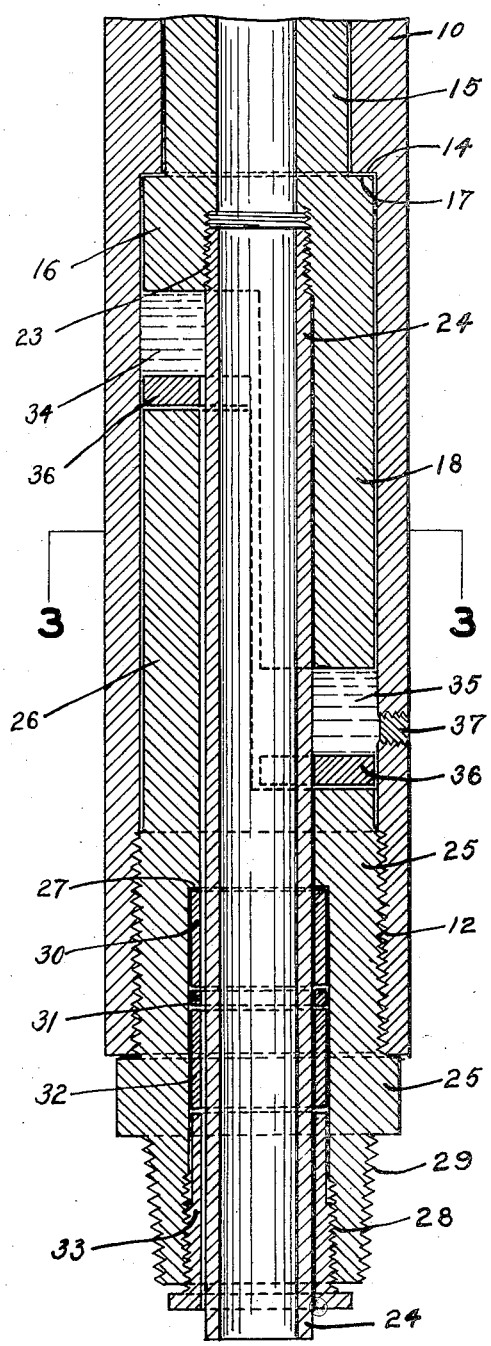

It is understood that various changes in the form, proportion, size, shape, weight, and other details of construction within the scope of our invention, may be resorted to without departing from the spirit or broad principles of our invention, and without sacrificing any of the advantages thereof; and it is also understood that the drawings are to be interpreted as being illustrative and not restrictive.

A description of one practical embodiment of the invention as illustrated in the drawings follows:

In Fig. 4, the reference numeral 1 indicates the device as a whole disposed between sections of a usual drill-stem 2, in a well 3. The drilling column is supported in a usual manner by a rotary table 4 above the surface 5 of the earth, and at its lower end is connected to a usual rotary drill-bit by a coupling or other desirable connecting means 7.

Figure 2:
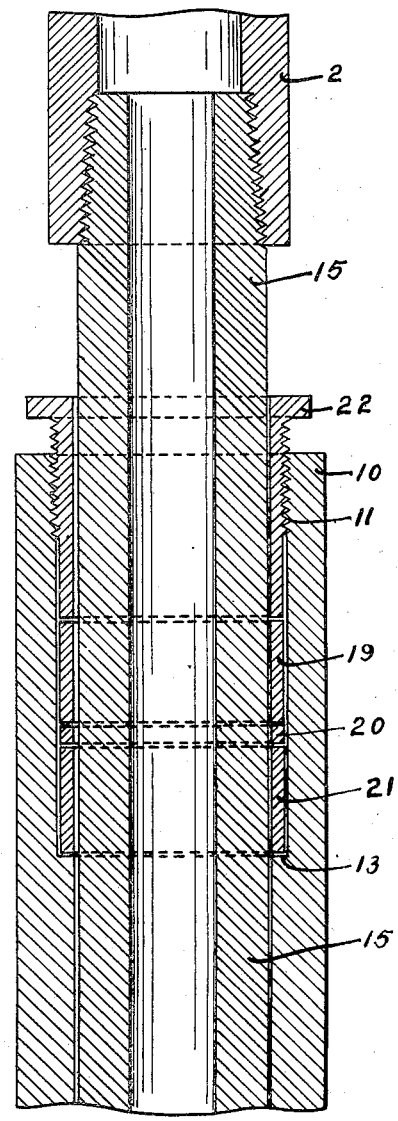
Fig. 2 is a similar view through the upper portion of the device.

As best illustrated in Figs. 1, 2, and 3, the device 1 consists substantially of a hollow tubular member or sleeve 10 having upper interior threads 11 and lower interior threads 12. The walls of the sleeve 10 are formed to produce abrupt inwardly extending shoulders 13 and 14. Disposed within the bore of the sleeve 10 and protruding thereabove, is provided a hollow tubular member 15, the upper end of which is threadedly connected to the lower end of one of the sections of the drill-stem 2. At a point below said shoulder 14, the member 15 is abruptly enlarged as shown at 16 to form a shoulder 17, and the enlarged portion 16 is of a circumference sufficient to snugly yet slidably fit within the bore of the sleeve 10 below the shoulder 14. The portion of the member 15 lying above the shoulder 17 is of a circumference sufficient to barely fit within the upper portion of the bore of said sleeve 10. Integral with and depending from one-half of the enlarged portion 16 is an arcuate element 18 which in cross-section forms substantially a continuation of one-half of the wall of the member 15.

Surrounding the upper portion of the member 15, within the bore of the sleeve 10, and resting upon said shoulder 13, are provided a plurality of sealing rings 19, 20, and 21 which are held in place by a packing nut 22. Said enlarged portion 16 is provided at its lower end with interior threads 23 which connect the upper end of a tubular wash-pipe 24 which extends downwardly past and protrudes from within the lower end of said sleeve 10.

Surrounding the wash-pipe 24 and threadedly engaged by said threads 12, is provided a hollow nut 25 which has an upstanding integral arcuate element 26. In cross-section said element forms substantially a continuation of one-half of the wall of said nut 25. The arcuate elements 18 and 26 are radially disposed to lap each other as illustrated in Figs. 1 and 3, and together form a tube.

The lower portion of the bore of said nut 25 is enlarged abruptly to form a shoulder 27 and its extreme lower portion is provided with interior threads 28. The lower end of the nut 25 is exteriorly provided with threads 29 for engaging the upper end of a section of the drill stem 2, or if desired, the upper end of the drill-bit 6. Packing rings 30, 31, and 32, or other desired packing means, are provided within the enlarged portion of the bore of said nut 25 and around the wash-pipe 24, and are held in place by a packing nut 33 engaged by the threads 28. The wash-pipe acts as a means for conveying a drilling-fluid downwardly through the device, and the packing means both upper and lower are designed to effectually prevent the ingress of drilling-fluid from the exterior of the device into its working parts.

The respective lengths of elements 18 and 26 are such that arcuate cavities 34 and 35 are formed. The upper cavity 34 lies between the lower end of the enlargement 16 and the upper end of the element 26, while the lower cavity 35 lies between the upper surface of the body of the nut 25 and the lower end of the element 18. Within each of the cavities is provided a semi-circular resilient shock receiving member 36, and the remainder of each cavity is filled or partially filled with a desired fluid, not shown. The fluid may be introduced into the cavities through apertures in the wall of the member 10, one of which is shown in Fig. 1 as being closed by a plug 37.

In assembling the device, the member 15 with the wash-pipe 24 attached thereto is first inserted upwardly into the sleeve 10, and the rings 19, 20, 21 and the packing-nut 22 are installed. The shock receiving members 36 are next placed upon their respective portions of the nut 25 and the nut is threaded into the lower end of the sleeve 10. Finally, rings 30, 31 and 32 and packing nut 33 are placed in the nut 25 and around the lower portion of the wash-pipe. After the device is thus assembled, the desired fluid is injected into the cavities 34 and 35. The device may then be attached at any desired point in the drilling column, but it is preferable that it be connected adjacent the drill-bit.

When the bit is resting upon the bottom of a well, the entire weight of the drilling column is supported by the members 36 and the fluid in the cavities 34 and 35, but when the column is raised the bit only or the bit and that portion of the column lying below the device is supported by the shock absorbing medium.

Obviously the invention is susceptible of embodiment in forms other than that which is illustrated in the accompanying drawings and described herein, and is applicable for uses and purposes other than as detailed, and we therefore consider as our own all such modifications and adaptations and other uses of the form of the device herein described as fairly fall within the scope of our invention.

We have contemplated threadedly attaching or making the wash-pipe 24 integral with the body of the nut 25, and thus eliminating the lower packing means and packing nut, and we therefore reserve the right to do so if found desirable.

Right is also reserved to form the upper end of the member 15 and the lower end of the nut 25 to attach any form of pipe coupling.

It is preferable that the rings 19, 21, 30, and 32 be made of a resilient material, and that the rings 20 and 31 be made of metal, but we do not wish to confine ourselves to any specific packing medium as it may be found desirable in some instances to use entirely a mechanical medium and in others to use entirely air, gas or a liquid.

In the description herein the nut 25 has been described as lying at the lower end of the device, but it may be seen that the device will function when inverted.

Having thus described our invention, what is claimed and desired to be secured by Letters Patent, is:

1. In a shock or vibration absorber for drill stem, a tubular element rotatable with one section of the stem, another element connected to another section of the stem and rotatable by the first mentioned element and adapted for longitudinal movement with relation thereto, a hydraulic shock or vibration absorbing medium confined between the two elements, and means for conveying a fluid between the stem sections and preventing its mixture with the shock absorbing medium.

2. In a shock or vibration absorber for drill stem, a tubular element rotatable with one section of the stem, another element connected to another section of the stem and rotatable by the first mentioned element and adapted for longitudinal movement with relation thereto, means for confining a fluid shock or vibration absorbing medium between the two elements, and means for conveying a second fluid between the stem sections in a manner preventing its mixture with the shock absorbing medium.

3. In a shock or vibration absorber for drill stem, a tubular element rotatable with one section of the stem, another element connected to another section of the stem and rotatable by the first mentioned element and adapted for longitudinal movement with relation thereto, a hydraulic shock or vibration absorbing medium confined between the two elements, and a wash-pipe carried by one element and extending through the other for conveying a fluid from one stem section to the other and for preventing mixture of the fluid and the shock absorbing medium.

4. In a shock or vibration absorber for drill stem, a tubular element rotatable with one section of the stem, another element connected to another section of the stem and rotatable by the first mentioned element and adapted for longitudinal movement with relation thereto, a hydraulic shock or vibration absorbing medium confined between the two elements, means for confining said medium between said elements, and a wash-pipe carried by one element and extending through the other for conveying a fluid from one stem section to the other and for preventing mixture of the fluid and the shock absorbing medium.

5. In a shock or vibration absorber for rotary drill stem, a tubular member connected to the lower end of a section of drill stem and forming a continuation of the bore thereof, a semi-cylindrical projection depending from said member, a second tubular member rigidly carried by the upper end of another section of drill stem and forming an upper continuation of the bore thereof, a semi-cylindrical projection upstanding from the second member and acting with the first mentioned projection to form a substantially tubular jacket, means for holding the two members to a limited longitudinal movement with relation to each other, a concentrically located pipe carried by the first member and extending through the second member, the first member when rotated adapted to drive the second member to rotation, resilient means between said members for absorbing shock occasioned by the longitudinal movement of either, and a shock absorbing fluid confined between the two members.

6. In a shock or vibration absorber for rotary drill stem, a tubular member connected to the lower end of a section of drill stem and forming a continuation of the bore thereof, a semi-cylindrical projection depending from said member, a second tubular member rigidly carried by the upper end of another section of drill stem and forming an upper continuation of the bore thereof, a semi-cylindrical projection upstanding from the second member and acting with the first mentioned projection to form a substantially tubular jacket, means for holding the two members to a limited longitudinal movement with relation to each other, a concentrically located pipe carried by the first member and extending through the second member, the first member when rotated adapted to drive the second member to rotation, and a shock absorbing fluid confined between the two members for absorbing shock occasioned by the longitudinal movement of either member.

7. In a shock or vibration absorber for rotary drill stem, two complemental members each carried by an adjacent end of one of two sections of drill stem, a housing for the adjacent ends of said members, said housing acting to confine the members to a limited longitudinal movement with relation to each other, said members so arranged that the rotation of one will cause the rotation of the other, a shock absorbing fluid confined between the members for absorbing shock occasioned by the longitudinal movement of either member, and means for conveying a second fluid between the stem sections in a manner preventing its mixture with the first mentioned fluid.

8. In a shock or vibration absorber for rotary drill stem, two complemental members each carried by an adjacent end of one of two sections of drill stem, a housing for the adjacent ends of said members, said housing acting to confine the members to a limited longitudinal movement with relation to each other, said members so arranged that the rotation of one will cause the rotation of the other, hydraulic means within the housing for absorbing shock occasioned by the longitudinal movement of either member, and means for conveying a drilling fluid between the stem sections and for preventing entry of the fluid into the hydraulic means.

9. Organization as described in claim 8, in which the hydraulic means consists of two spaced chambers having a restricted communication therebetween, and a fluid in one of the chambers, the chambers so arranged that relative longitudinal movement of either causes the fluid to flow through the communication into the other.

ELDRIDGE B. GILL.
GUY O. DANIELSON.